(12) United States Patent  
Enokihara

(10) Patent No.: US 6,826,134 B2  
(45) Date of Patent: Nov. 30, 2004

(54) OPTICAL DISK DEVICE WITH TRACKING ADJUSTMENT AND SLED ADJUSTMENT OF OPTICAL PICKUP AND METHOD FOR CONTROLLING THE DEVICE

(75) Inventor: Takashi Enokihara, Ibaraki (JP)

(73) Assignee: Sony Computer Entertainment Inc., Tokyo (JP)

( * ) Notice: Subject to any disclaimer, the term of this patent is extended or adjusted under 35 U.S.C. 154(b) by 371 days.

(21) Appl. No.: 10/044,851

(22) Filed: Nov. 7, 2001

(65) Prior Publication Data

US 2002/0105866 A1 Aug. 8, 2002

(30) Foreign Application Priority Data

Nov. 8, 2000 (JP) .................................... 2000-340254  
Oct. 31, 2001 (JP) .................................... 2001-334810

(51) Int. Cl.⁷ .............................................. G11B 7/09
(52) U.S. Cl. ........................ 369/44.29; 369/44.27; 369/30.16
(58) Field of Search ................ 369/44.29, 44.35, 369/44.27, 30.15, 30.16

(56) References Cited

U.S. PATENT DOCUMENTS

| | | | | |
|---|---|---|---|---|
| 5,343,454 A | * | 8/1994 | Watanabe et al. | 369/44.32 |
| 5,495,455 A | * | 2/1996 | Kawashima et al. | 369/13.11 |
| 5,828,637 A | * | 10/1998 | Kim | 369/44.28 |
| 6,011,902 A | * | 1/2000 | Yamamoto | 388/815 |
| 6,025,907 A | | 2/2000 | Nakayama et al. | |
| 6,044,050 A | * | 3/2000 | Kuroiwa | 369/44.41 |
| 6,341,103 B1 | * | 1/2002 | Takeda et al. | 369/30.15 |
| 6,421,198 B1 | * | 7/2002 | Lamberts et al. | 360/77.04 |
| 6,459,663 B1 | * | 10/2002 | Hayami | 369/44.29 |
| 6,603,640 B1 | * | 8/2003 | Prater et al. | 360/265.6 |
| 6,633,025 B2 | * | 10/2003 | Youn | 250/201.5 |
| 6,633,520 B1 | * | 10/2003 | Song | 369/44.28 |

FOREIGN PATENT DOCUMENTS

| | | |
|---|---|---|
| JP | 64-035731 | 2/1989 |
| JP | 10-208254 | 8/1998 |
| JP | 11-195237 | 7/1999 |
| JP | 2001-273646 | 10/2001 |

* cited by examiner

Primary Examiner—Gautam R. Patel  
(74) Attorney, Agent, or Firm—Katten Muchin Zavis Rosenman

(57) ABSTRACT

Optical disk device, in which tracking adjustment systems and a sled adjustment system are controlled independently, has offset value acquisition capability, which detects drive signals output from tracking adjustment systems and acquires tracking drive offset values. Such disk also has an offset value comparison capability, which compares the acquired tracking offset value and the offset center value in the state in which no tracking adjustment control is done, a search direction acquisition capability, which acquires the search direction of optical pickup from the control instruction that is output from the control system and sled drive decision capability, which decides whether to drive sled adjustment system based on the comparison result and the acquired search direction.

18 Claims, 4 Drawing Sheets

OPTICAL DISK DEVICE WITH TRACKING ADJUSTMENT AND SLED ADJUSTMENT OF OPTICAL PICKUP AND METHOD FOR CONTROLLING THE DEVICE

FIELD OF THE INVENTION

This invention concerns an optical disk device that has a tracking adjustment system that performs tracking adjustment of an optical pickup with respect to said optical disk in order to read-write information by focusing a light spot from an optical pickup onto the optical disk, a sled adjustment system that adjusts the sled position of said optical pickup, and a control means that controls these adjustment systems. This invention can be used in an optical disk device that regenerates information recorded on, for example, a CD, CD-ROM, DVD, or DVD-ROM and records/regenerates information with respect to a CD-R, CD-RW, DVD-R, or DVD-RW.

BACKGROUND OF THE INVENTION

Optical disk devices that play (or regenerate) information recorded on a CD, CD-ROM, DVD, DVD-ROM, etc., and optical disk devices that record/play information with respect to a CD-R, CD-RW, DVD-R, DVD-RW, etc. are known. These optical disk devices are constructed so as to record and/or play information by shining a light spot from an optical pickup onto the information recording surface of a mounted optical disk and detecting the reflected light. Such an optical disk device has a tracking adjustment system and sled adjustment system, etc., and the attitude of the optical pickup with respect to the optical disk device is adjusted by outputting control instructions from a control means that controls these systems.

The tracking adjustment system is the part that detects with high precision the information that is recorded on the optical disk by causing the optical pickup to follow the tracks on the optical disk. It has a two-axis adjustment mechanism that adjusts the tilt position and plane direction position of the objective lens that constitutes the optical pickup with respect to the information recording surface of the optical disk, and an actuator that supplies driving force to such two-axis adjustment mechanism.

The sled adjustment system is the part that adjusts the radial-direction position of the optical pickup with respect to the optical disk. It has a mechanism main body having a rack, which extends along the radial direction of the optical disk and on which the optical pickup is mounted, and a toothed wheel that engages with this rack, as well as a stepping motor that causes the toothed wheel to rotate.

In such an optical disk device, in order to cause a track jump operation to be performed to move to the target track by jumping across multiple tracks all at once, first, by means of the tracking adjustment system, one adjusts the attitude of the object lens that constitutes the optical pickup while detecting the tracking error signal output from the optical pickup, and moves the center of the light spot to the target track; next, in correspondence with this, a so-called traverse movement is executed by means of the sled adjustment (system) to bring the optical pickup to immediately below the target track.

Heretofore, the tracking adjustment system and sled adjustment system were set inside the same control digital signal processor (DSP), and control was done in such a way as to keep the speed of the traverse constant by making use of an internal autosequencer and making the tracking adjustment system and the sled adjustment system move in cooperation.

But in an adjustment system in which the tracking adjustment system and the sled adjustment system are thus made to move in cooperation, even when it is necessary to perform tracking adjustment because of a disturbance such as eccentricity of the optical disk, sled adjustment gets done along with it, so there is the problem that the sled adjustment system may reacts oversensitively to eccentricity of the optical disk, etc.

But in a structure in which the tracking adjustment system and the sled adjustment system are thus kept independent, when the aforesaid traverse movement is to be made, it is necessary to first align the center of the light spot on target track for only the tracking system, that is, in a state in which the tracking system does not operate, creating the problem that the farther away the target track is, the narrower the movement-direction field of view of the optical pickup may becomes, making inferiority in detecting the optical disk track.

SUMMARY OF THE INVENTION

It is an object of the present invention to provide an optical disk device in which it is possible to overcome above-mentioned problem.

The optical disk device of this invention, in a composition that independently controls the sled adjustment system and tracking adjustment system, accomplishes the aforesaid purpose by detecting the tracking drive signal for driving that is output from the tracking adjustment system, and performing drive control of the sled adjustment system based on such tracking drive signal.

Specifically, the optical disk device of this invention, which is an optical disk device that has a tracking adjustment system that, by shining a light spot from an optical pickup onto an optical disk, adjusts the tracking of said optical pickup with respect to said optical disk in order to do recording and/or playback of information, a sled adjustment system that adjusts the sled position of said optical pickup, as well as a control means that controls these adjustment systems, is characterized in that said sled adjustment system and said tracking adjustment system are controlled independently.

Such disk device has an offset value acquisition means that detects the tracking drive signal for driving that is output from said tracking adjustment system and acquires this signal value as tracking drive offset values, an offset value comparison means that compares the offset center value, which is the tracking drive offset value in the state in which no tracking adjustment control is done, and the offset representative value computed by this offset value acquisition means, a search direction acquisition means that acquires the track search direction of said optical pickup from a control instruction output from said control means and a sled drive decision means that decides whether to drive said sled adjustment system based on the comparison result by said offset value comparison means and the track search direction obtained by said search direction acquisition means.

The sled drive decision means is so as to decide to drive the sled adjustment system (a) if the result by the offset value comparison means is that the tracking drive offset value is greater than or equal to the offset center value and the search direction obtained by the search direction acquisition means is the direction going radially outward on the optical disk, or (b) if the result by the offset value comparison means is that the tracking drive offset value is less than the offset center value and the search direction obtained by the search direction acquisition means is the direction going radially inward on the optical disk.

With an embodiment of the this invention as thus described, by the offset value acquisition means, the tracking drive signal is detected and tracking drive offset signals are acquired, and the tracking drive offset value obtained is compared with the offset center value by the offset value comparison means, so in drive control of the sled adjustment in track search, the adjustment state of the tracking adjustment system can be ascertained.

In addition, whether to drive the sled adjustment system is decided by the sled drive decision means based on the track search direction obtained by the search direction acquisition means and the result obtained by the offset value comparison means, and drive control of the sled adjustment system is done by the control means. Therefore even if the mode is not one in which the tracking adjustment system and the sled adjustment system move in cooperation, traverse movement in track searches can be certainly realized, and because they do not move in cooperation, the sled adjustment system can be prevented from reacting oversensitively together with tracking adjustment.

Furthermore, because the sled drive decision means is constituted so as to decide to drive the sled adjustment system in the above-described cases (a) or (b), the driving of the sled adjustment system is performed only in the case of necessity. That is, with (a) the tracking drive offset value greater than or equal to the offset center value, it is decided that the position of the objective lens in the tracking adjustment system is in a state going radially outward on the optical disk, so if the search direction is radially outward on the optical disk, and further one strengthens the tracking adjustment, then the field of view of the optical pickup will become narrower. Conversely, in the case where the relationship between the tracking drive offset value and the offset center value is as described above, the tilt direction of the objective lens of the optical pickup and the search direction are in a reverse-facing relationship, so even if the traverse movement is continued, the field of view of the optical pickup will not become narrow, and there is no need to perform driving of the sled adjustment system. The case of (b) is in a reverse relationship with the case of (a), i.e., if the tracking drive offset value is less than the offset center value and the search direction is radially outward, then the field of view of the optical pickup will not become narrow, and similarly there will be no need to perform driving of the sled adjustment system.

In the foregoing, it is desirable that the control instruction that is output from the above-described control means to the sled adjustment system be generated based on the difference between the offset center value and the tracking drive offset value in the offset value comparison means.

By thus taking the difference of the two offset values, one can roughly ascertain the tilt, with respect to the optical disk, of the objective lens that constitutes the optical pickup in the tracking adjustment system. Therefore by generating and outputting the control instruction that is output from the control means to the sled adjustment system based on this difference, sufficient sled adjustment can be done to correct the tilt of the objective lens, so by alternately drive-controlling the tracking adjustment system and the sled adjustment system, continuous traverse movement can be realized.

Also, it is desirable that the above-described offset value acquisition means, offset value comparison means, search direction acquisition means, and sled drive decision means be constituted as software expanded in a microcomputer that includes the control means. By thus constituting each means as software expanded in a microcomputer, it is no longer necessary to build into the optical disk device a DSP, etc. especially for sled adjustment, thereby reducing the manufacturing cost of the optical disk device and making it possible to change the control method simply, just by replacing the software when the sled adjustment control method is to be changed.

Also, in the optical disk device of this invention, which is an optical disk device that has a tracking adjustment system that, by shining a light spot from an optical pickup onto an optical disk, performs tracking adjustment of said optical pickup with respect to said optical disk in order to record and/or play information, a sled adjustment system that adjusts the sled position of said optical pickup and a control means that controls these adjustment systems, said sled adjustment system and said tracking adjustment system are controlled independently.

Such device also has a means that detects the tracking drive signal for driving that is output from said tracking adjustment system, a means that detects the tilt, from a basic state, of the objective lens that constitutes said optical pickup based on the values of said detected tracking drive signal, a search direction acquisition means that acquires the track search direction of said optical pickup from a control instruction output from said control means and a means that decides the drive mode of said sled adjustment system based on the tilt of said objective lens from the standard state and said track search direction.

DETAILED DESCRIPTION OF THE PREFERRED EMBODIMENTS

Figure 1:
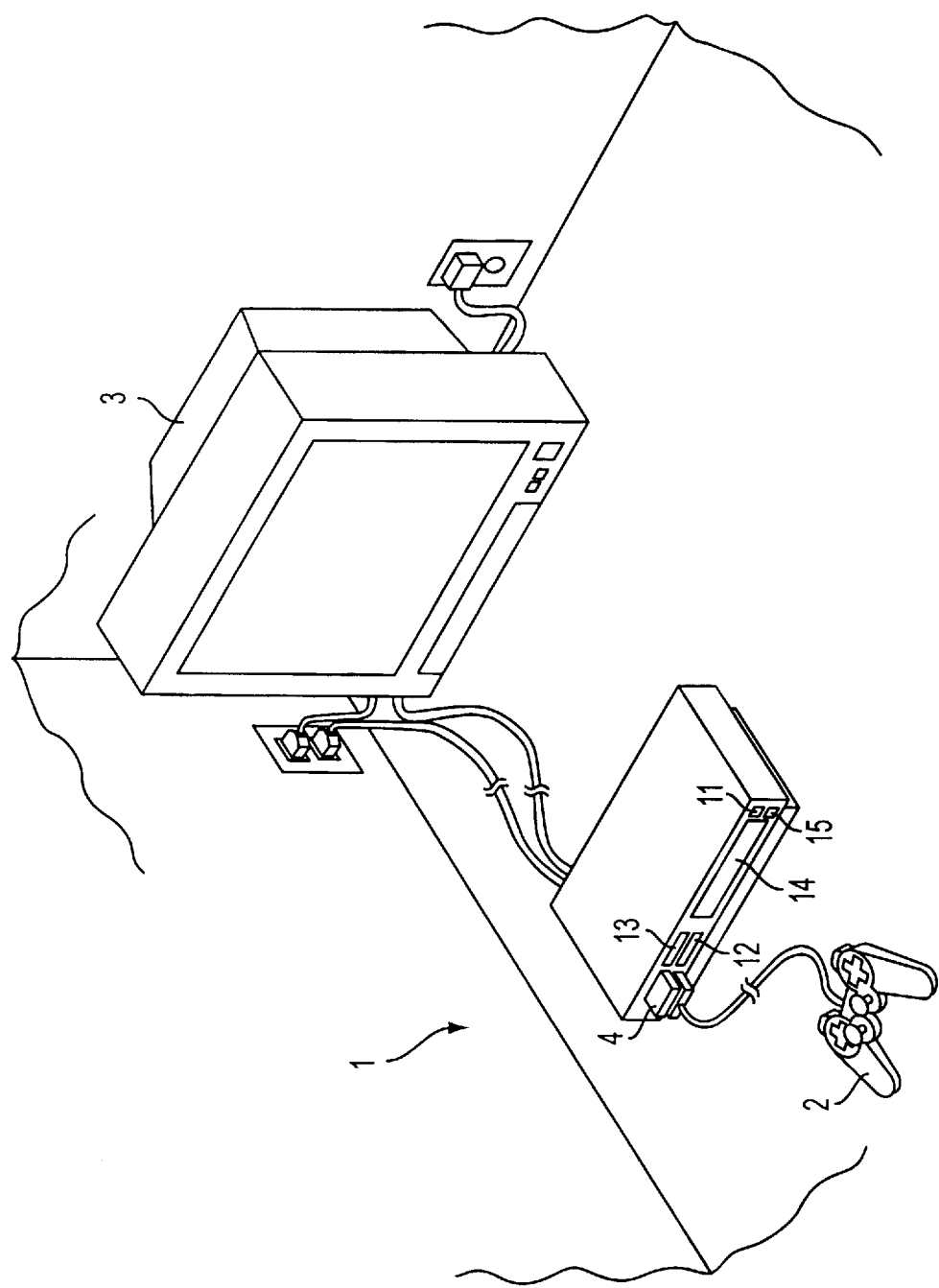
FIG. 1 is a rough perspective view of an entertainment device relating to an embodiment of this invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 shows entertainment device 1 on which is mounted an optical disk device relating to an embodiment of the present invention. Such entertainment device 1 is for regenerating and executing a game program, etc. recorded on a CD (compact disc), CD-ROM, DVD (digital versatile (video) disk), DVD-ROM, or other optical disk (or discal recording medium). Instructions from the user during program execution are given by the user operating the operation controller 2. The output unit of said entertainment device 1 is connected to a television receiver or other display device 3, and the image generated by execution of the program is displayed on this display device 3.

The power to entertainment device 1 is supplied by the commercial public power source supplied to general homes. Entertainment device 1 starts by turning on a master switch (not pictured) on the back of the device and pressing power switch 11 on the front of the device. This power switch 11 functions as a reset button when it is pressed during operation of entertainment device 1.

Provided on the front of entertainment device 1 are controller slot 12 and card slot 13. Operation controller 2 is connected to controller slot 12, and memory card 4 is connected to card slot 13. Provided on the front of the device, next to controller slot 12 and card slot 13, is optical disk device (or optical disk driver) 14. This optical disk device 14 is a disk loading type optical disk device that is constructed in such a way that operating operation switch 15 causes the disk tray to advance and retract from entertainment device 1.

Figure 2:
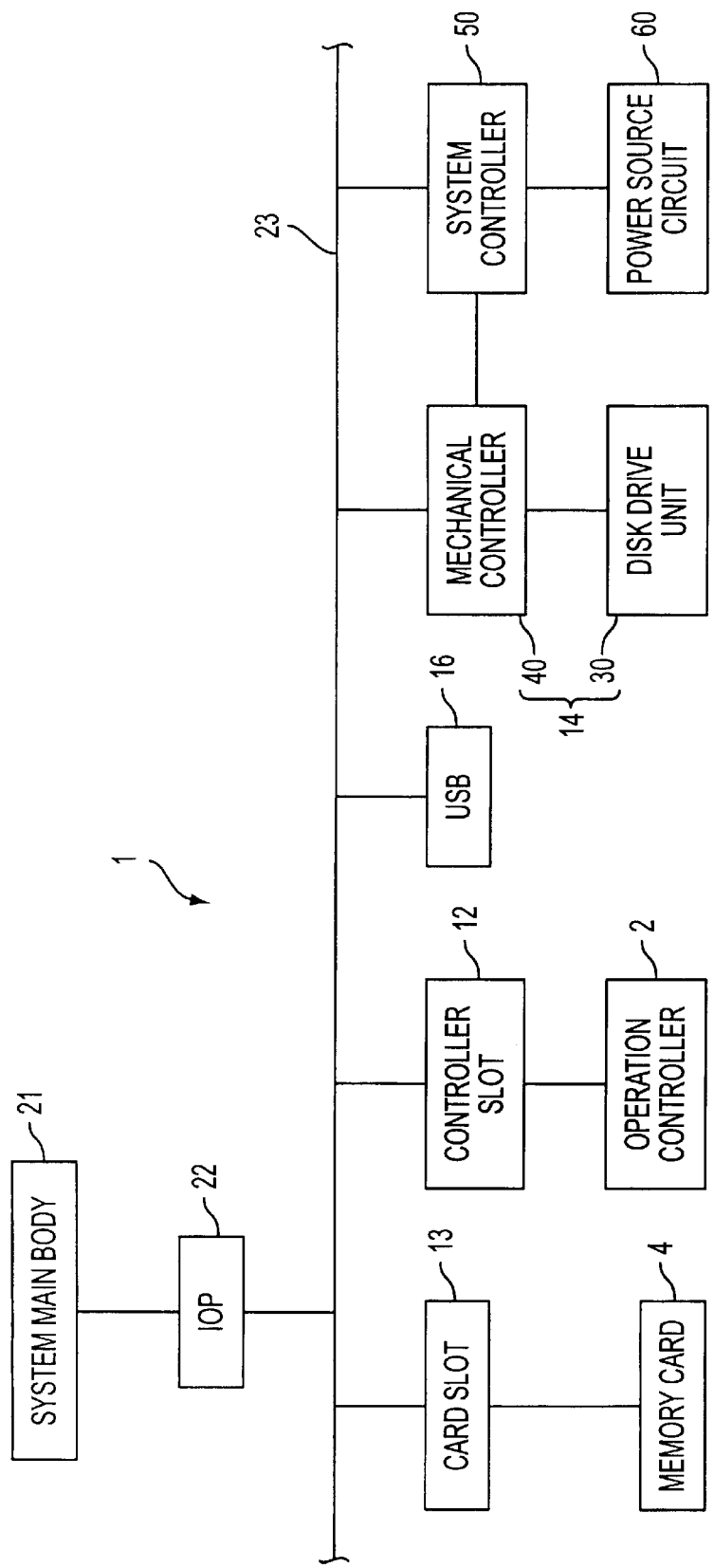
FIG. 2 is a block diagram showing the internal structure of the entertainment device of the invention.

As shown in FIG. 2, the main body of the device inside entertainment device 1 has system main body 21 as the main board on which a CPU (central processing unit) is mounted, and I/O port 22, which is connected to said system main body 21. Connected to I/O port 22, via bus line 23, are controller slot 12, card slot 13, USB port 16, etc., as well as mechanical controller 40 and system controller 50. System main body 21 computationally processes software for control of the device as a whole as well as game programs, etc. This system main body 21 performs operation control of operation controller 2 and other external devices connected via I/O port 22 to controller slot 12, card slot 13, USB port 16, etc., as well as operation control of mechanical controller 40 and system controller 50. System main body 21 also processes signals output from external devices, etc. connected to I/O port 22.

As shown in FIG. 2, optical disk device 14, which is also shown in FIG. 1, has disk drive unit 30 and mechanical controller 40. Mechanical controller 40 performs operation control of disk drive unit 30, as will be described below in greater detail. Disk drive unit 30 is connected to bus line 23 via this mechanical controller 40. System controller 50 controls power circuit 60 and manages the state of the supply of power in entertainment device 1 as a whole based on signals from power switch 11 and sensors (not pictured) that monitor the temperature state of the CPU that constitutes system main body 21. Power circuit 60 is connected to bus line 23 via this system controller 50.

Mechanical controller 40 and system controller 50 are constituted with a direct port connection, not via bus line 23, between them whereby, according to the operation signal of power switch 11, system controller 50 outputs a Low/High two-level signal to mechanical controller 40. If, for example, power switch 11 is pressed at initial startup, it outputs a Low, and it outputs a High if during operation of entertainment device 1 power switch 11 is pressed and a restart command is given.

Figure 3:
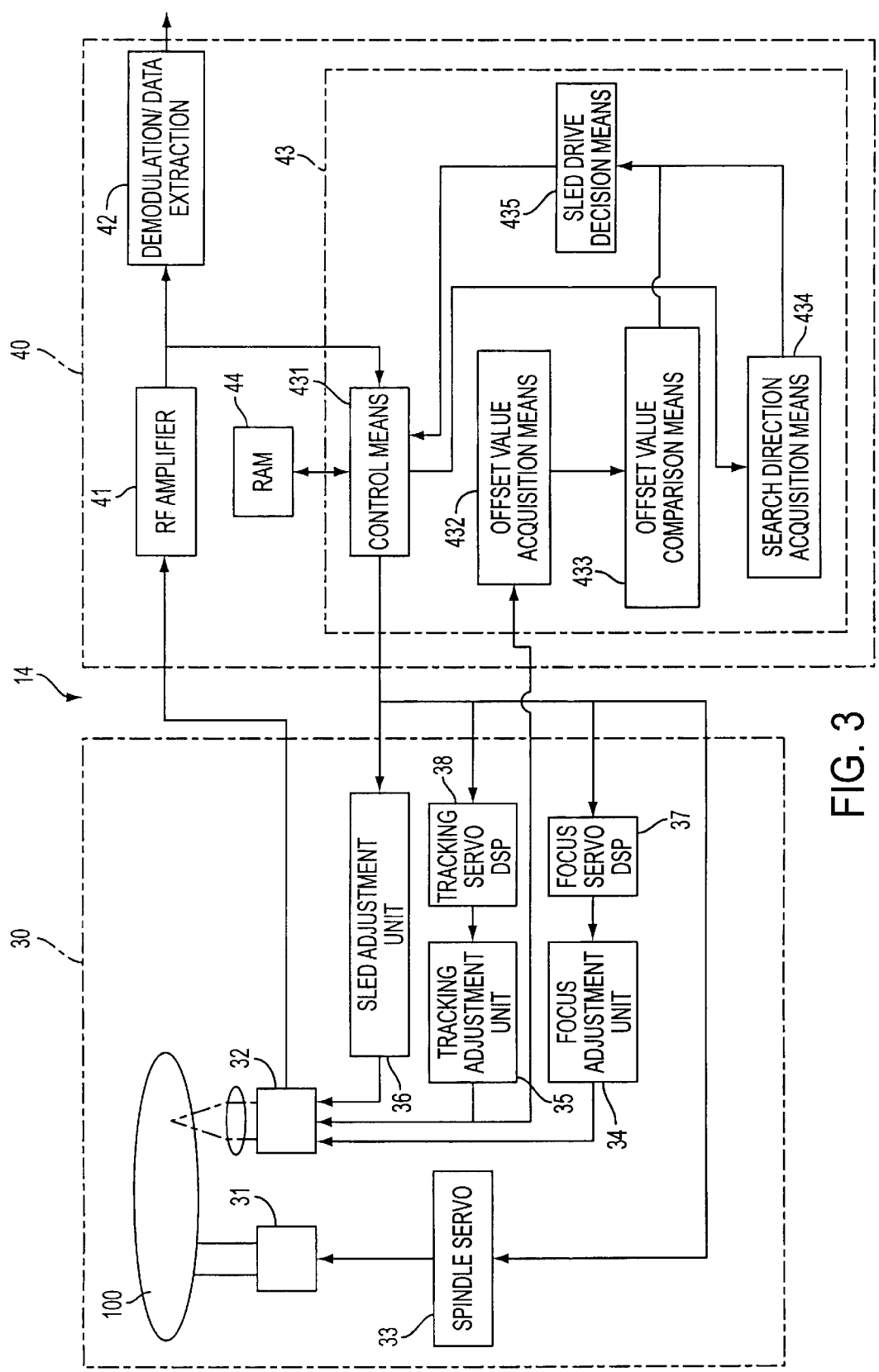
FIG. 3 is a block diagram showing the structure of the disk drive unit, and the mechanical controller that controls said disk drive unit, which constitute the optical disk device of the invention.

As shown in FIG. 3, disk drive unit 30 has spindle motor 31 and optical pickup 32, spindle servo unit 33, focus adjustment unit 34, tracking adjustment unit 35, sled adjustment unit 36, focus servo DSP 37 and tracking servo DSP 38. Also, although not pictured in FIG. 3, provided on disk drive unit 30 are a skew adjustment unit that adjusts the tilt position of optical pickup 32 with respect to optical disk 100, a disk loading mechanism for extending and retracting the disk tray from entertainment device 1, and a raising and lowering mechanism that raises and lowers spindle motor 31 and optical pickup 32 so that they do not interfere with the disk tray when this disk tray is extended and retracted.

Spindle motor 31 rotates optical disk 100 mounted on the disk tray and provided on the rotation shaft end of said spindle motor 31 is a chucking member that engages with the center hole in optical disk 100. This spindle motor 31 is rotationally controlled by spindle servo unit 33 so that information can be detected by optical pickup 32 regardless of any differences in the radial-direction position of optical pickup 32 with respect to optical disk 100.

Said focus adjustment unit 34 performs position adjustment of optical pickup 32 so that the focal point depth of the light (or laser beam) spot shined (or emitted) from optical pickup 32 remains constant with respect to the recording layer (information recording surface or surface for recording/reading) of optical disk 100. This focus adjustment unit 34 has an advance-and-retract mechanism that adjusts position of optical pickup 32 toward/away from the information recording layer of optical disk 100, an actuator that is the drive source for this advance-and-retract mechanism, as well as a driver that drives it. The control signals output from control means 431 of below-described control unit 43 are input into this actuator via focus servo DSP 37, and drive control of focus adjustment unit 34 is performed. That is, focus adjustment unit 34 and focus servo DSP 37 constitute the focus adjustment system.

Said tracking adjustment unit 35 has a two-axis device that performs adjustment of the objective lens that constitutes optical pickup 32 so that the light spot from optical pickup 32 shines (or focuses) accurately onto the tracks of optical disk 100, an actuator that provides driving power to this two-axis device and a driver that drives it. As in the case of focus adjustment unit 34, control instructions output from control means 431 are input into the actuator via tracking servo DSP 38, and drive control of tracking adjustment unit 35 is performed. That is, tracking adjustment unit 35 and tracking servo DSP 38 constitute the tracking adjustment system.

Said sled adjustment unit 36 adjusts position of optical pickup 32 in the radial direction of optical disk 100 by track jumps, etc. Although not pictured, said sled adjustment unit 36 has a sled feed mechanism that consists of a rack that extends along the radial direction of optical disk 100 and a toothed wheel that engages with this rack, a stepping motor that causes this toothed wheel to rotate, and a driver IC for driving the motor. Optical pickup 32 is attached on the rack, and when the toothed wheel turns by driving the stepping motor, the rack causes optical pickup 32 to move along the radial direction of optical disk 100. Sled adjustment unit 36 and control means 431 of control unit 43 are connected without going through a DSP.

Mechanical controller 40 has RF amplifier 41, demodulation/data extraction unit 42, control unit 43, and RAM (random access memory) 44. Although not pictured, mechanical controller 40 is connected to an E2PROM (EEPROM: Electrically Erasable Programmable Read Only Memory) which is mounted on a circuit board that includes said mechanical controller 40. RF amplifier 41 amplifies the RF signal output from optical pickup 32 of disk drive unit 30 and outputs it to demodulation/data extraction unit 42. Demodulation/data extraction unit 42 demodulates this RF signal and extracts the necessary data. As shown in FIG. 2, the extracted data is output to system main unit 21 via bus line 23 and I/O port 22 and is processed by said system main unit 21.

As shown in FIG. 3, control unit 43 outputs control instructions to spindle servo unit 33, focus adjustment unit 34, tracking adjustment unit 35, and sled adjustment unit 36, which constitute disk drive unit 30. This control unit 43 has control means 431, which generates control instructions to these adjustment units 33–36, offset value acquisition means 432 for generating control instructions to sled adjustment unit 36, offset value comparison means 433, search direction acquisition means 434, and sled drive decision means 435. These means 431–435 are constituted as software that is executed (expanded) on a microcomputer that constitutes control unit 43. Of course, each means 431–435 can be constituted as a unit of electronic circuit.

Although not pictured, said control means 431 is functionally divided into spindle rotation control, tracking drive control, focus drive control, and sled drive control. This control means 431 acquires a tracking signal output from RF amplifier 41, and based on this performs control of focus adjustment unit 34 and tracking adjustment unit 35. With respect to sled adjustment unit 36, control based on the tracking error signal is not done as previously.

Said offset value acquisition means 432 detects the tracking drive signal (or signal for tracking drive) for drive of actuator of tracking adjustment unit 35 and acquires the signal value (i.e., value of the tracking drive signal) as a tracking drive offset value.

Said offset value comparison means 433 compares the offset center value recorded in said EEPROM and the tracking drive offset value acquired by offset value acquisition means 432. The offset center value can be obtained by measuring beforehand the tracking drive offset value in a state in which no tracking adjustment is done, that is, in a state in which the two-axis device of tracking adjustment unit 35 is in a neutral state (standard state). This offset center value can be used suitably for sled adjustment by loading it into RAM 44 from the EEPROM at the startup of entertainment device 1.

The comparison in this offset value comparison means 433 is done according to the larger-smaller relationship between the offset center value and the tracking drive offset value, and the larger-smaller relationship between the two, as well as their difference, is output to below-described sled drive decision means 435.

Said search direction acquisition means 434 acquires the track search direction of optical pickup 32 from the control instruction that is generated by above-described control means 431 when optical pickup 32 is to make a traverse movement. The track search direction is either radially outward on the optical disk (the Fwd direction), or radially inward (the Rev direction). The track search direction acquired by this search direction acquisition means 434 is input to sled drive decision means 435.

Said sled drive decision means 435 is the part that decides, based on the comparison result output from offset value comparison means 433 and the track search direction output from search direction acquisition means 434, whether to drive sled adjustment unit 36. Specifically, in this embodiment, it decides that sled adjustment unit 36 shall be driven under the following two conditions.

(a) If the tracking drive offset value is greater than or equal to the offset center value and the search direction is the Fwd direction.

If the tracking drive offset value is greater than the offset center value, it is decided that the objective lens that constitutes optical pickup 32 is facing in the Fwd direction, so if the tilt of the objective lens is further strengthened by tracking adjustment unit 35, the tilt of the objective lens with respect to the information recording surface (or recording layer) of optical disk 100 will become tight (larger in absolute value), and the field of view of optical pickup 32 will become narrow. Therefore, in order to avoid this, the sled position of optical pickup 32 is adjusted in the Fwd direction, the tilt of the objective lens is returned to the center position, and the field of view of optical pickup 32 is secured.

(b) If the tracking drive offset value is less than the offset center value and the search direction is the Rev direction.

This is the case that is opposite from (a), and similarly in such a case too, it is decided that the objective lens is facing in the Rev direction, so the sled position of optical pickup 32 is adjusted in the Rev direction, the tilt of the objective lens is returned to the center position, and the field of view of optical pickup 32 is secured.

The decision result by such sled drive decision means 435 and the difference in offset values in offset value comparison means 433 are output to control means 431. Based on the decision result and the difference in offset values, a control instruction to be output to sled adjustment unit 36 is generated by control means 431.

Figure 4:
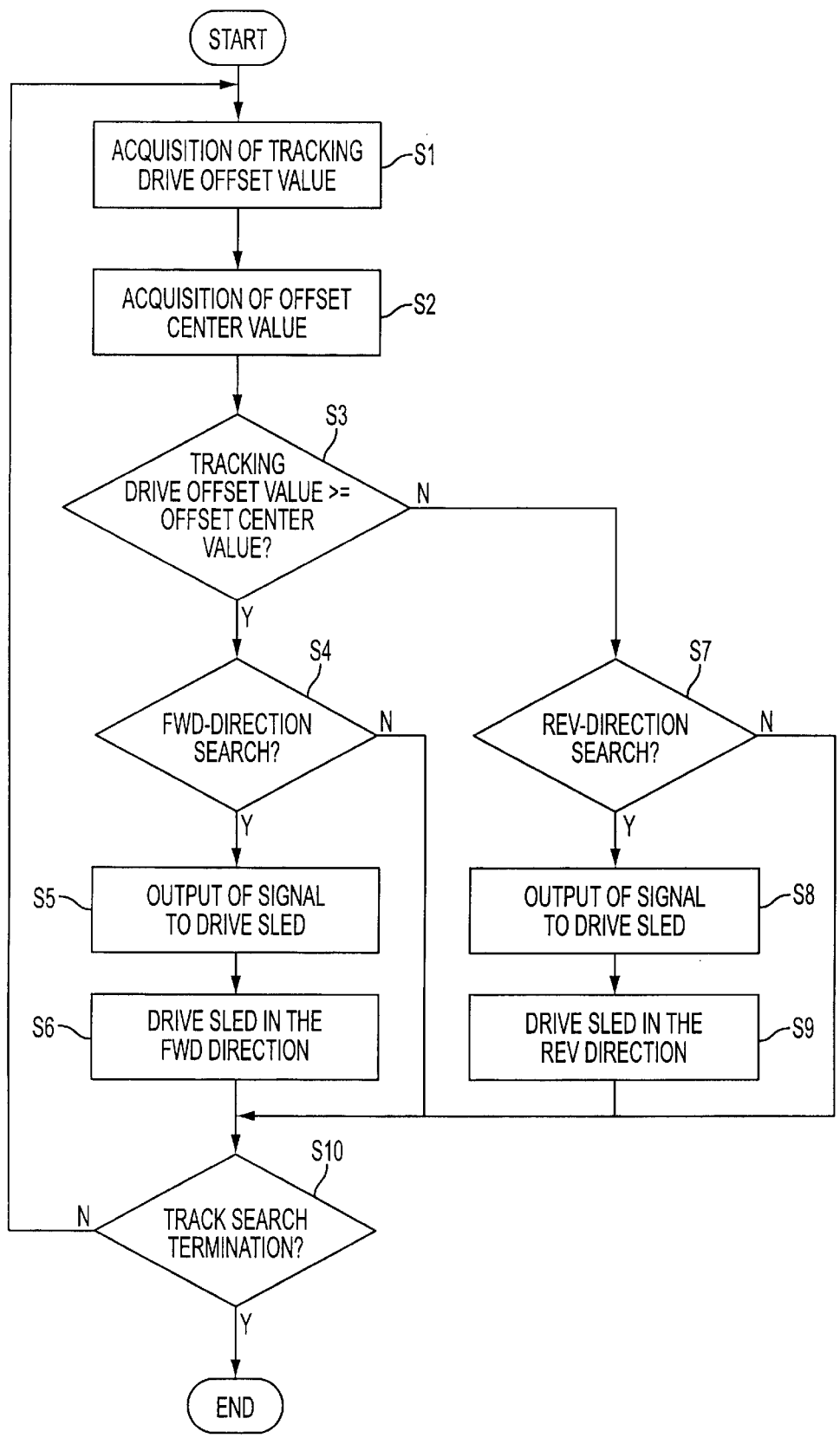
FIG. 4 is a flowchart showing the procedure for doing track search of the optical pickup of the invention.

Next it is described, with reference to the flowchart shown in FIG. 4, the procedure in an optical disk device of the above-described embodiment for executing a track search by repeating track jumps by traverse movement in order to move optical pickup 32 in the sled direction to the prescribed track.

(1) When the user operates operation controller 2 to output to system main body 21 an operation signal to begin a track search, or, as a result of computation processing by system main body 21, an instruction to begin a track search is generated, the instruction (operation signal) is input into mechanical controller 40 via I/O port 22.

(2) Offset value acquisition means 432 detects a tracking drive signal for drive of actuator of tracking adjustment unit 35, acquires the signal value of the tracking drive signal as a tracking drive offset value (processing S1), and outputs it to offset value comparison means 433.

(3) Offset value comparison means 433 acquires the offset center value loaded in RAM 44 (processing S2), then decides whether the tracking drive offset value output from offset value acquisition means 432 is greater than or equal to the offset center value (processing S3).

(4) If the tracking drive offset value is greater than or equal to the offset center value, then the track search direction of optical pickup 32 is acquired by search direction acquisition means 434, and it is decided whether it is a track search in the Fwd direction (processing S4). If it is not a track search in the Fwd direction, sled drive decision means 435 decides that it is not necessary to drive sled adjustment unit 36, and does not output to control means 431 a signal to drive sled adjustment unit 36.

(5) If it is a track search in the Fwd direction that decided in said processing S4, sled drive decision means 435 outputs to control means 431 a signal to make a sled adjustment in the Fwd direction and outputs to control means 431 the difference between the tracking drive offset value and the offset center value (processing S5).

(6) Based on the signal output from sled drive decision means 435, control means 431 generates and outputs a control instruction that includes the drive direction and drive amount for sled adjustment unit 36, and drives sled adjustment unit 36 in the Fwd direction (processing S6).

(7) On the other hand, if the decision in offset value comparison means 433 is a decision that the tracking drive offset value is smaller than the offset center value, then, as stated above, the track search direction is acquired by search direction acquisition means 434, and it is decided whether it is a track search in the Rev direction (processing S7).

(8) If it is decided that the track search is in the Rev direction, then sled drive decision means 435 outputs to control means 431 a signal to make a sled adjustment in the Rev direction, and outputs to control means 431 the difference between the tracking drive offset value and the offset center value (processing S8). If the track search is not in the Rev direction, sled drive decision means 435 decides that it is not necessary to drive sled adjustment unit 36, and does not output to control means 431 a signal to drive sled adjustment unit 36.

(9) Based on the signal output from sled drive decision means 435, control means 431 generates and outputs a control instruction that includes the drive direction and drive amount for sled adjustment unit 36, and drives sled adjustment unit 36 in the Rev direction (processing S9).

(10) The above processing is repeated until the target track is reached and the track search ends (processing S10). When the target track is reached, the processing is ended.

The above-described embodiment has the following effects.

In the present embodiment, mechanical controller 40 has offset value acquisition means 432, wherein, by detecting the tracking drive signal for driving the tracking adjustment system, the tracking drive offset value is acquired, and the tracking drive offset value is compared with the offset center value by offset value comparison means 433. This makes it possible, during drive control of the sled adjustment in a track search, to ascertain the adjustment state of the objective lens in the tracking adjustment system, that is, its state of tilt with respect to optical disk 100. The tilt of the objective lens can be considered as a parameter representing the tile of the laser beam with respect to the optical disk 100.

Based on the track search direction (Fwd direction or Rev direction) acquired by search direction acquisition means 434 and the result obtained by offset value comparison means 433, it is decided by sled drive decision means 435 whether to drive sled adjustment unit 36. Therefore, even if the mode is not the one in which tracking adjustment unit 35 and sled adjustment unit 36 move in cooperation, traverse movement in track searches can be surely realized. In addition, because it is not a composition in which the two adjustment units 35 and 36 move in cooperation, sled adjustment unit 36 can be prevented from reacting oversensitively together with tracking adjustment.

Moreover, because sled drive decision means 435 makes the decision to drive sled adjustment unit 36 only in the above-described cases (a) or (b), the sled adjustment is done only when the field of view of the objective lens that constitutes optical pickup 32 becomes narrow. Thus, the driving of sled adjustment unit 36 is done only when it is necessary.

Furthermore, because the composition is such that sled drive decision means 435 outputs to control means 431 the difference between the tracking drive offset value acquired by offset value acquisition means 432 and the offset center value, the tilt of the objective lens that constitutes optical pickup 32 can be ascertained by control means 431. Therefore the tilt of the objective lens can be corrected to a state near the neutral state by generating, based on this difference, a control instruction to be output from control means 431 to sled adjustment unit 36. So by alternately controlling the tracking adjustment unit 35 and the sled adjustment unit 36, continuous traverse movement can be realized.

And, by constituting the above-described offset value acquisition means 432, offset value comparison means 433, search direction acquisition means 434, and sled drive decision means 435 as software executed in a microcomputer that constitutes control unit 43, it is no longer necessary to build into disk drive unit 30 a DSP, etc. especially for sled adjustment, thereby reducing the manufacturing cost of optical disk device 14. In addition, because another sled adjustment control method can be implemented just by replacing the software, one can cope with various design changes and control method changes for optical disk device 14.

This invention is not limited to the above embodiment; it also includes variants such as, but not limited to the following.

In the described embodiment, optical disk device 14 was built into entertainment device 1, but it is not limited to this. That is, the same effects as the effects described for the above embodiment can be enjoyed even if this invention is used in an optical disk device built into a personal computer or in an independent optical disk device.

In addition, a greater-smaller comparison is made in processing S3 between the tracking drive offset value and the offset center value, and according to the comparison results, it is decided in processing S4 and processing S7 whether it is a Fwd-direction search or a Rev-direction search, but it is not limited to this. That is, one may first make the track search direction decision and then make a greater-smaller comparison between the tracking drive offset value and the offset center value and decide whether to carry out the sled drive.

Also, for the specific structure and shape, etc. when implementing this invention, other structures, etc. may be adopted as long as they achieve the purpose of this invention.

As described above, with the optical disk device of the embodiment of this invention, a tracking drive offset value is acquired by detecting the tracking drive signal, and the tracking drive offset value is compared with the offset center value. This has the effect of making it possible, during drive control of the sled adjustment in a track search, to ascertain the adjustment state of the tracking adjustment system, to surely realize traverse movement in track searches even if the mode is not one in which the tracking adjustment system and the sled adjustment system move in cooperation, and, because it is not a composition in which they move in cooperation, to prevent the sled adjustment system from reacting oversensitively together with tracking adjustment.

While the present invention has been described at some length and with some particularity with respect to the described embodiment, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. An optical disk device for writing on and/or reading from an optical disk information by focusing a light spot from an optical pickup onto the optical disk, said optical disk device comprising:

a tracking adjustment system that performs tracking adjustment of said optical pickup with respect to said optical disk;

a sled adjustment system that adjusts a sled position of said optical pickup; and a control means that controls said tracking and sled adjustment systems, wherein said sled adjustment system and said tracking adjustment system are controlled independently, and wherein said optical disk device further comprises:

an offset value acquisition means that detects a tracking drive signal output from said tracking adjustment system and acquires signal values of said tracking drive signal as tracking drive offset values;

an offset value comparison means that compares an offset center value, which is the tracking drive offset value in the state in which no tracking adjustment control is performed, and the tracking drive offset values computed by said offset value acquisition means;

a search direction acquisition means that acquires a track search direction of said optical pickup from a control instruction output from said control means; and a sled drive decision means that decides whether to drive said sled adjustment system based on a comparison result by said offset value comparison means and the track search direction obtained by said search direction acquisition means, and wherein said sled drive decision means makes the decision to drive said sled adjustment system (a) if the result by said offset value comparison means is that the tracking drive offset value is greater than or equal to the offset center value and the search direction obtained by said search direction acquisition means is the direction going radially outward on said optical disk, or (b) if the result by said offset value comparison means is that the tracking drive offset value is less than the offset center value and the search direction obtained by said search direction acquisition means is the direction going radially inward on said optical disk.

2. An optical disk device according to claim 1, wherein a control instruction output from said control means to the sled adjustment system is generated based on the difference between the offset center value and the tracking drive offset value acquired in said offset value comparison means.

3. An optical disk device according to claim 1, wherein said offset value acquisition means, said offset value comparison means, said search direction acquisition means, and said sled drive decision means are constituted as software executed in a microcomputer that includes said control means.

4. An optical disk device for writing on and/or reading from an optical disk information by focusing a light spot from an optical pickup onto the optical disk, said optical disk device comprising:

a tracking adjustment system that performs tracking adjustment of said optical pickup with respect to said optical disk;

a sled adjustment system that adjusts a sled position of said optical pickup; and a control unit that controls said tracking and sled adjustment systems, wherein said sled adjustment system and said tracking adjustment system are controlled independently, and wherein said disk device further comprises:

a unit that detects the tracking drive signal output from said tracking adjustment system;

a unit that, based on a signal value of said detected tracking drive signal, detects the tilt, from a standard state, of an objective lens that comprises said optical pickup;

a search direction acquisition unit that acquires a track search direction of said optical pickup from a control instruction output from said control unit; and a unit that decides whether the sled adjustment system should be driven and the drive mode of said sled adjustment system based on the combination of the tilt of said objective lens from the standard state and said track search direction acquired from the control instruction output from said control unit.

5. An optical disk device according to claim 4, wherein said drive mode is the mode in which said sled adjustment system is driven so that said tilt decreases in absolute value.

6. An optical disk device according to claim 4, wherein said unit that decides the drive mode drives said sled adjustment system in the same direction as said track search direction if said track search direction is the direction in which said tilt increases in absolute value.

7. An optical disk device according to claim 4, wherein said unit that decides the drive mode does not drive said sled adjustment system if said track search direction is the direction in which said tilt decreases in absolute value.

8. An optical disk device according to claim 4, wherein said unit that detects the tilt further comprises:

an offset value acquisition unit that acquires the value of said tracking drive signal as a tracking drive offset value; and a unit that determines said tilt based on the value of the difference between said tracking drive offset value and a prescribed standard value.

9. An optical disk device according to claim 8, wherein said prescribed standard value is said tracking drive offset value of the case when said objective lens is in the neutral state.

10. A control method for an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control means that controls said tracking and sled adjustment systems, wherein said sled adjustment system and said tracking adjustment system are controlled independently, wherein said control method comprises:

an offset value acquisition step that detects a tracking drive signal output from said tracking adjustment system and acquires signal values of said tracking drive signal as tracking drive offset values;

an offset value comparison step that compares an offset center value, which is the tracking drive offset value in the state in which no tracking adjustment control is performed, and the tracking drive offset values computed by said offset value acquisition step;

a search direction acquisition step that acquires a track search direction of said optical pickup from a control instruction output from said control means; and a sled drive decision step that decides whether to drive said sled adjustment system based on a comparison result by said offset value comparison step and the track search direction obtained by said search direction acquisition step, and wherein said sled drive decision step makes the decision to drive said sled adjustment system (a) if the result by said offset value comparison step is that the tracking drive offset value is greater than or equal to the offset center value and the search direction obtained by said search direction acquisition step is the direction going radially outward on said optical disk, or (b) if the result by said offset value comparison step is that the tracking drive offset value is less than the offset center value and the search direction obtained by said search direction acquisition step is the direction going radially inward on said optical disk.

11. A control method according to claim 10, wherein a control instruction output from said control means to the sled adjustment system is generated based on the difference between the offset center value and the tracking drive offset value acquired in said offset value comparison step.

12. A control method for an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control unit that controls said tracking and sled adjustment systems, wherein said sled adjustment system and said tracking adjustment system are controlled independently, wherein said control method comprises:

a step that detects a tracking drive signal output from said tracking adjustment system;

a step that, based on a signal value of said detected tracking drive signal, detects the tilt, from a standard state, of an objective lens that comprises said optical pickup;

a search direction acquisition step that acquires the track search direction of said optical pickup from a control instruction output from said control unit; and a step that decides whether the sled adjustment system should be driven and the drive mode of said sled adjustment system based on the combination of the tilt of said objective lens from the standard state and said track search direction.

13. A control method according to claim 12, wherein said drive mode is the mode in which said sled adjustment system is driven so that said tilt decreases in absolute value.

14. A control method according to claim 12, wherein said step that decides the drive mode drives said sled adjustment system in the same direction as said track search direction if said track search direction is the direction in which said tilt increases in absolute value.

15. A control method according to claim 12, wherein said step that decides the drive mode does not drive said sled adjustment system if said track search direction is the direction in which said tilt decreases in absolute value.

16. A control method according to claim 12, wherein said step that detects the tilt further comprises:

an offset value acquisition step that acquires the value of said tracking drive signal as a tracking drive offset value; and a step that determines said tilt based on the value of the difference between said tracking drive offset value and a prescribed standard value.

17. A control method according to claim 16, wherein said prescribed standard value is said tracking drive offset value of the case when said objective lens is in the neutral state.

18. A control method for an optical disk device that writes on and/or reads from an optical disk information by focusing a light spot from an optical pickup onto the optical disk, and includes a tracking adjustment system that performs tracking adjustment of said optical pickup with respect to said optical disk, a sled adjustment system that adjusts a sled position of said optical pickup, and a control unit that controls said tracking and sled adjustment systems, wherein said sled adjustment system and said tracking adjustment system are controlled independently, wherein said control method comprises:

a step that detects a tracking drive signal output from said tracking adjustment system;

a step that, based on a signal value of said detected tracking drive signal, detects the tilt, from a standard state, of a laser beam emitted from said optical pickup;

a search direction acquisition step that acquires the track search direction of said optical pickup from a control instruction output from said control unit; and a step that decides whether said sled adjustment system should be driven and the drive mode of said sled adjustment system based on the combination of said tilt of the laser beam and said track search direction acquired from said control instruction output from said control unit.

* * * * *